United States Patent [19]

Ishigaki

[11] Patent Number: 4,723,755
[45] Date of Patent: Feb. 9, 1988

[54] TWO-PORT SOLENOID VALVE
[75] Inventor: Tsuneo Ishigaki, Soka, Japan
[73] Assignee: SMC Corporation, Tokyo, Japan
[21] Appl. No.: 868,514
[22] Filed: May 30, 1986
[30] Foreign Application Priority Data Jun. 1, 1985 [JP] Japan .................................. 60-83074

[51] Int. Cl.4 ............................................ F16K 31/06
[52] U.S. Cl. ............................. 251/129.19; 251/319; 251/75
[58] Field of Search ...................... 251/282, 75, 129.19, 251/319

[56] References Cited

U.S. PATENT DOCUMENTS 3,431,028  3/1969  Yoder .......................... 251/129.02 X
3,780,984  12/1973  Ambrose et al. ................ 251/319 X
4,409,580  10/1983  Ishigaki .

FOREIGN PATENT DOCUMENTS 559478  6/1923  France ............................ 251/129.19

Primary Examiner—Arnold Rosenthal
Attorney, Agent, or Firm—Oblon, Fisher, Spivak, McClelland & Maier

[57] ABSTRACT

In a two-port solenoid valve having a valve head to open and close the valve seat operated by an electromagnet, the valve member is slidably connected to the valve housing by means of a stem and which cross-sectional area is somewhat smaller than the effective area of the valve port so that a force to close the valve is developed by the pressure of the fluid on the valve inlet side when the valve is closed. When current is momentarily passed to the electromagnet, the armature of the magnet moves the valve head over such a small distance as is just enough to slightly move the valve head away from the valve seat, thereby causing the fluid pressure in the outlet, this pressure works thrust force on the valve head to opening direction, and the valve is hold in the fully opened position. As the armature of the magnet is not required to do any more work than to slightly open a passage between the inlet and the outlet, this permits shortening the travel stroke of the armature and thus reducing the size of the electromagnet in the solenoid valve.

4 Claims, 3 Drawing Figures

TWO-PORT SOLENOID VALVE

BACKGROUND OF THE INVENTION

1. Field of the Invention

This invention relates to a two-port solenoid valve that is adapted to open on momentary supply of current and remain in the opened position.

2. Description of the Prior Art

Some of self-holding type solenoid valves are opened by a momentary supply of current to an electric cally energizing coil and remain in the fully opened position after the current is switched off by means of a permanent magnet or the like. However, to open the valve, as with common solenoid valves, the solenoid must have a large enough capacity to pull the valve away from the valve seat into the fully opened position when current is supplied to the coil thereof. In this type of solenoid, however, the armature is in the remotest position from the fixed iron core when the valve is pulled away from the valve seat, the attraction force between armature and fixed iron core is very weak at this position in spite of the valve opening requiring the largest force. For this reason, the conventional solenoid valves of the above type are relatively large and costly.

SUMMARY OF THE INVENTION

The object of this invention is to provide such a two-port solenoid valve that after the valve is slightly opened by the action of a armature, the valve is moved to and then held in the fully opened position by the pressure of the fluid flowing through the valve housing, thereby shortening the travel stroke of the armature and reducing the size of the solenoid are much as possible.

In order to achieve the above object, a two-port solenoid valve according to this invention has a valve seat and a valve member in the inlet port side of valve housing, the valve member is composed of a valve head and a stem, the valve member is slidably connected to the valve housing by means of the stem. The crosssectional area of the stem is made smaller than the effective area of the valve seat so that a valve closing force is developed by the pressure of the fluid on the inlet side when the valve is closed. The tip of a push rod that is thrust by the armature of the solenoid member toward the valve-opening direction is placed on the valve head, thereby allowing the armature to travel over a small enough distance to move the valve head slightly away from the valve seat.

In this two-port valve wherein the crosssectional area of the stem is smaller than the effective area of the valve seat, the valve head is normally held in the closed position by the pressure of the fluid from the inlet that works on the difference of the area therebetween. When current is momentarily supplied to the solenoid, the push rod thrusts the valve head to slightly open the valve seat, whereupon the fluid flows toward the outlet side. The pressure of the fluid opens the valve head to the fully opened position and keeps the same in the same condition.

With the necessity of moving the valve head to the full opening position thus eliminated, the armature need not do any more work than slightly opening a passage between the two ports. This permits shortening the travel stroke of the armature, therefore, reducing the size of the solenoid member.

A more complete appreciation of the invention and many of the attendant advantages thereof will be readily obtained as the same becomes better understood by reference to the following detailed description when considered in connection with the accompanying drawings, wherein:

DESCRIPTION OF THE EMBODIMENTS

Figure 1:
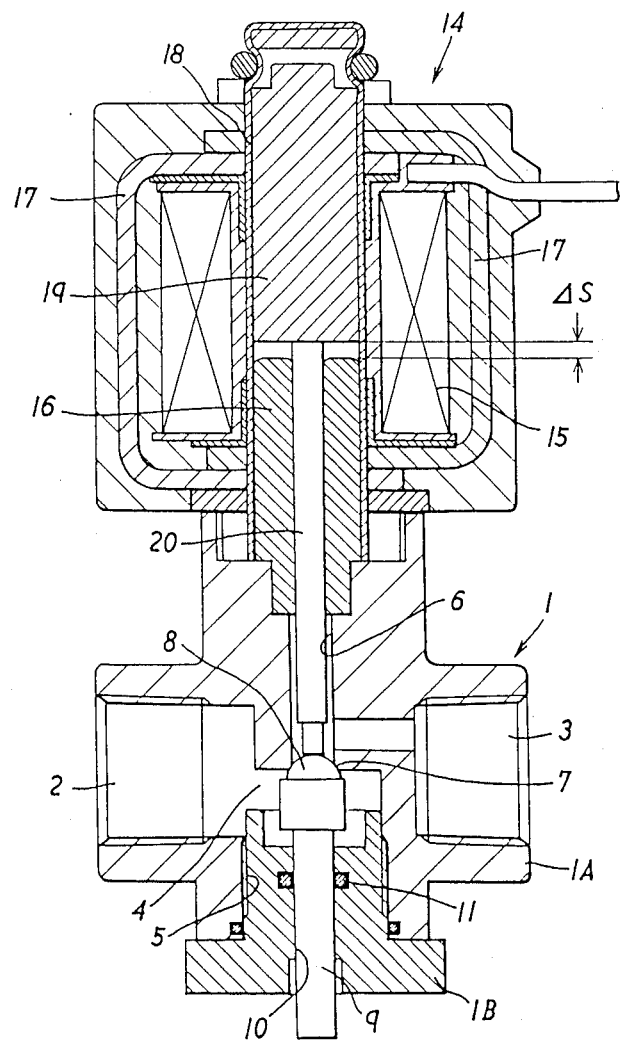
FIG. 1 is a cross-sectional front view of a embodiment.
Figure 2:
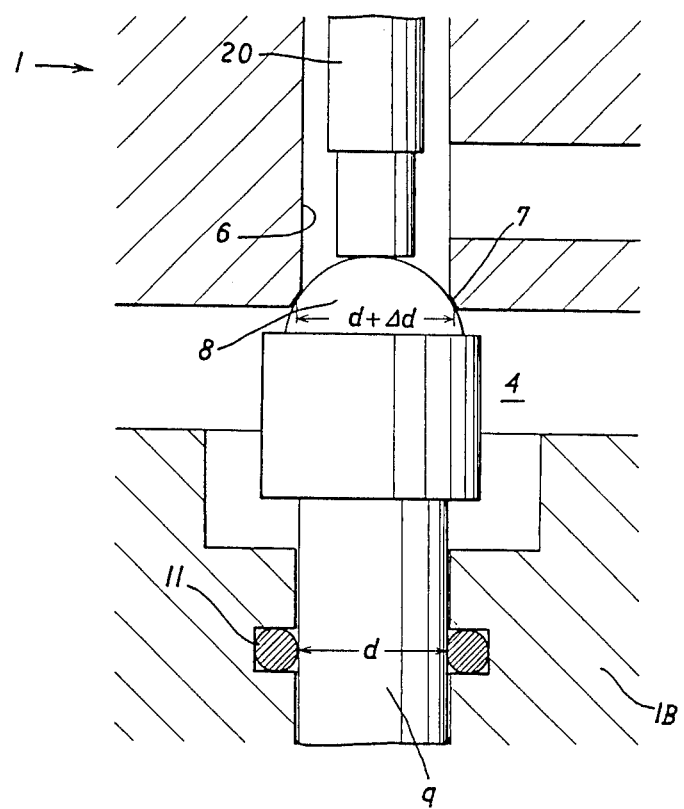
FIG. 2 is an enlarged cross-sectional view showing the principal portion of the same embodiment.

In a preferred embodiment of this invention shown in FIGS. 1 and 2, a valve housing 1 has an inlet port 2, an outlet port 3 and a passage 4 that brings the two ports 2 and 3 into communication with each other. The valve housing 1 is made up of a body block 1A and a valve support member 1B tightly fitted in a hole 5 opening to said passage 4. The body block 1A has a push-rod hole 6 at an opposite place to the valve support member 1B. The valve support member 1B has a through hole 10 into which the stem 9 of the valve member is inserted.

As is detailed in FIG. 2, at the open end of said pushrod hole 6, there is provided a valve seat 7 whose effective diameter is larger than the diameter d of the stem 9 by an increment of $\Delta d$. The valve seat 7 is opened and closed by the valve head 8 whose upper portions is semi-spherically shaped. The stem 9 extending from the valve head 8 is slidably inserted in the through hole 10, with the opposite end thereof projecting outside the valve housing 1. An O-ring 11 is provided midway of stem 9 for sealing.

A solenoid member 14 mounted on the valve housing 1 comprises an electrically energizing coil 15 of wire wound around a bobbin, a fixed iron core 16, magnetic frames 17, 17 surrounding the coil and iron core, a guide tube 18 of nonmagnetic material fitted in a bobbin hole in the coil 15 and an armature 19 slidably fitted in the guide tube 18, the whole assembly being contained in a mold of synthetic resin or other material.

The armature 19 has a push rod 20 at one end thereof. The push rod 20 passes through the center hole in the fixed iron core 16 and said push-rod hole 6, with the tip thereof extending to a point close to the top surface of the valve head 8. The armature 19 is adapted to be moved over a small stroke $\Delta s$ that is just enough for slightly moving the valve head 8 away from the valve seat 7.

Now the operation of the above preferred embodiment will be described in the following.

FIG. 1 shows a condition in which no current is passed to the electrically energizing coil 15. As mentioned before, the effective diameter of that portion of the valve head 8 which comes in contact with the valve seat 7 to close, is larger than the diameter d of the stem 9 by an increment of $\Delta d$. Consequently, the pressure of the fluid flowing from the inlet 2 works on the valve member due to the force resulting from the diameter difference $\Delta d$, thrusting the valve head 8 against the valve seat 7 to keep the valve in the closed position. In this condition, the tip of the push rod 20 is close to the valve head 8, leaving a clearance corresponding to the small stroke $\Delta s$ between the armature 19 and fixed iron core 16. This embodiment is assumed to be used in a condition that, at least when the valve is closed, the pressure at the outlet 3 and the pressure of the other end of the stem 9 are almost equal.

When current is momentarily put in the electrically energizing coil 15 in the condition shown in FIG. 1, the armature 19 is attracted toward the fixed iron core 16 over a small stroke Δs, whereupon the push rod 20 thrusts the valve head 8 to slightly open the valve seat 7. When the valve seat 7 is thus slightly opened, the pressurized fluid flows from the inlet 2 to the outlet 3, the pressure in the push-rod hole 6 rises up to some extent. This increased pressure works on the top surface of the valve head 8, reversing the direction of the force acting on the valve member 8,9. As a consequence, the valve head 8 is moved to open the valve seat 7 and is held in the fully opening position by the pressure of the fluid flowing through the passage 4.

Therefore, even if the current to the coil 15 is conducted in a pulsated manner, the valve head 8 is held in the fully opened position. Furthermore, there is no need for the armature to fully open the valve head 8. The task of the armature is not fully opening for fluid flow, it is only to open the valve head over such a distance sufficient to generate the pressure in the outlet side of valve seat 7. Consequently, the travel stroke of the armature can be made very small.

When the diameter of the valve port is D, the armature is commonly required to have a travel stroke of D/4. According to this invention, on the other hand, the travel stroke can be reduced to from ½ to ¼ of the commonly required distance since no greater stroke is needed than that sufficient to increase the pressure of the outlet side to some extent. Then, the force developed by the solenoid, which is inversely proportional to the square of the travel stroke of the armature, can be reduced to from ¼ to 1/16 of the standard level.

When the diameter of the push rod 20 is made smaller at the tip thereof than elsewhere as shown in FIGS. 1 and 2, the pressure working on the top surface of the valve head 8 increases rapidly when the valve head 8 is actuated to slightly open the valve seat 7, thus accelerating the action of the valve head 8 to open the valve seat 7.

From the fully opened position, the valve seat 7 is closed by the external force applied either manually or by other means on the tip of the stem 9 projecting outwardly against the pressure of the fluid inside the valve housing 1. When the valve head 8 closes again the valve seat 7 as shown in FIG. 1, the valve head 8 is kept in the closed position by the fluid pressure in the inlet 2.

The two-port solenoid valve just described is effective as an emergency valve, because the valve can put itself in the opened position by a momentary supply of current, the desired function is performed even if the electric system fails afterward. Another example of it's use is for the floats attached to a fishing net and the like that are set at the bottom of the sea. When refloating the fishing net, such floats are inflated with air to provide the buoyancy for raising the net to the surface. The air-inflation is achieved by supplying compressed air from an air tank through a solenoid valve which is opened by a signal sent from a sonar or other appropriate apparatus.

Figure 3:
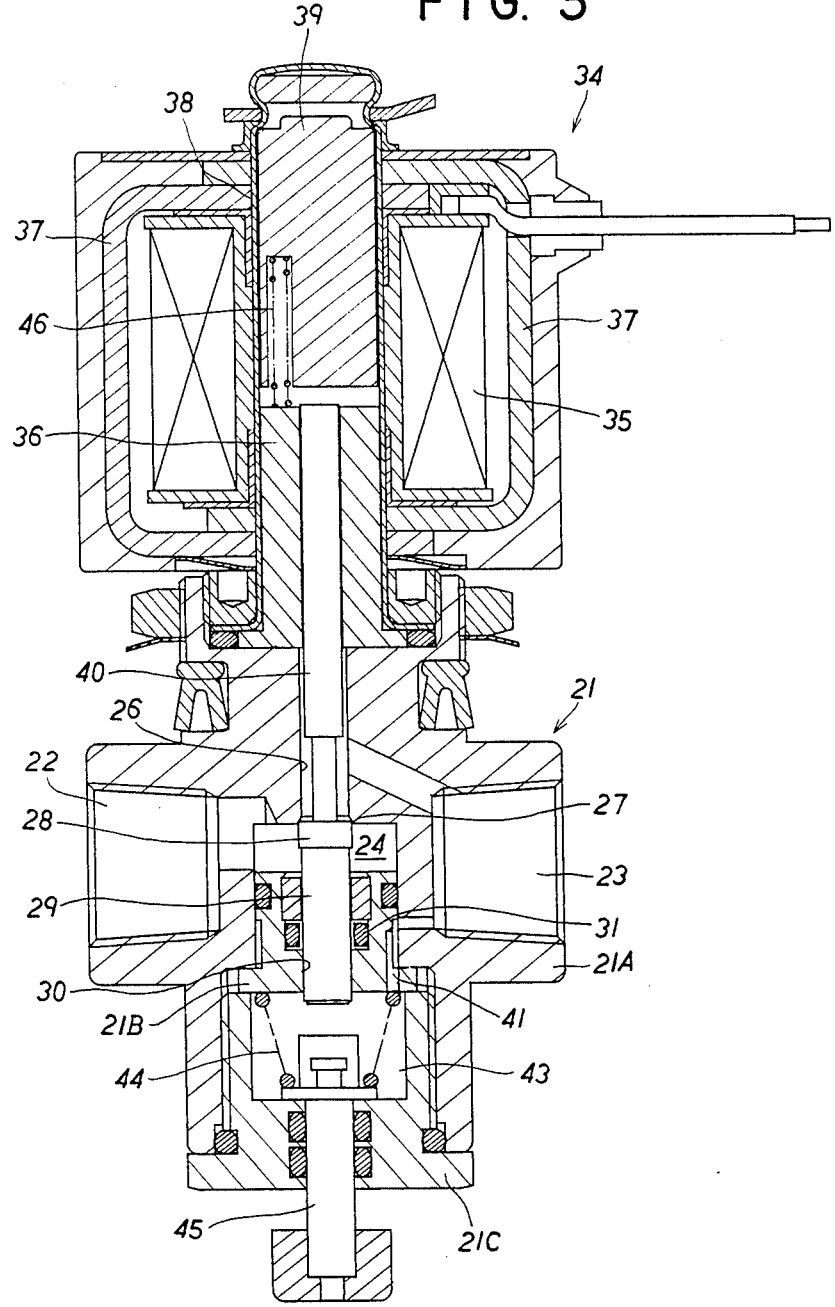
FIG. 3 is a cross-sectional front view of the other embodiment.

FIG. 3 shows a second preferred embodiment of this invention whose valve housing 21 comprises a body block 21A and a valve support member 21B of the type substantially similar to those of the first preferred embodiment described above and a valve-reset push-button support member 21C.

The valve-reset push-button support member 21C, which is screwed in the valve body block 21A to press and fix the valve support member 21B in position, forms a pressure chamber 43 that is in communication with an outlet 23 through a passage 41, in conjunction with the valve support member 21B. The support member 21C slidably supports a sealed valve-reset push button 45 that is urged away from the stem 29 of a valve head 28 by a reset spring 44 in the pressure chamber 43.

There is provided at the open end of a push-rod hole 26, as in the first preferred embodiment, a valve seat 27 whose effective diameter is larger than the diameter d of the stem 29 by an increment of Δd. The stem 29 of the valve head 28 that opens and closes the valve seat 27 is slidably inserted into a through hole 30, with the opposite end thereof projecting in the pressure chamber 43 and a sealing O-ring provided midway thereof.

A solenoid member 34 mounted on the valve housing 21 comprises, as in the first preferred embodiment, an electrically energizing coil 35, a fixed iron core 36, magnetic frames 37, a guide tube 38 of nonmagnetic material, and a armature 39. Between the armature 39 and the fixed iron core 36 is interposed a spring 46 that urges the two iron cores away from each other. A push rod 40 is passed through the push-rod hole 26 and fixed iron core 36, with one end thereof brought in contact with the valve head 28 and the other end projected somewhat beyond the fixed iron core 36 toward the armature 39. Because the structure of this second preferred embodiment is substantially equal to that of the first one in other respects, no further description is given.

The second preferred embodiment functions like the first preferred embodiment except in the following points.

In the second preferred embodiment, the tip of the stem 29 of the valve head 28 projects into the pressure chamber 43 communicating with the outlet 23 through the passage 41, whereby the pressure at the outlet 23 at the same level as that in the pressure chamber 43. Accordingly, the second preferred embodiment does not require that the fluid pressure at the outlet is substantially equal to the fluid pressure working on the outer end of the valve stem.

The spring 46 interposed between the armature 39 and fixed iron core 36 prevents malfunctioning due to vibrations or other causes that might occur in the first preferred embodiment, thereby allowing the two-port valve to be used in more varied environments. Furthermore, the space left between the armature 39 and push rod 40 allows the armature 39 to strike the push rod 40 impactly by it's stored kinetic energy. This permits further size reduction and more reliable operation of the solenoid.

When closing the valve seat 27 with the valve head 28, the reset push button 45 is pressed against the force of the reset spring 44 without bringing the valve head 28 in direct contact with the valve seat 27. This keeps the valve stem 29 free of the influence of external pressure and prevents the malfunctioning of the valve head.

In the two-port solenoid valve just described, the valve head is actuated to be brought into, and then kept in, the fully opened position when the valve seat is opened over a small distance corresponding to the small stroke of the armature. Therefore, the travel stroke of the movable iron core can be made very small as compared with the amount of displacement of the valve head and, therefore, the size of the electrically energizing coil can be reduced accordingly.

As the duration of current supply to the electrically energizing coil for valve seat opening is able to be shortened, even such a pulsated short current supply as in the form of a hazard signal is enough to open the valve seat, wherein the valve seat remains open even if the electric system fails afterward.

Preferred embodiments of this invention have been described in the foregoing, but it should be understood, as a matter of course, that they do not limit this invention in any way and can be modified or altered within the scope of this invention.

What is claimed is:

1. A two-port solenoid valve, utilizing a solenoid comprising:

a valve housing having a valve support member, an inlet and outlet and a passage communicating said inlet with said outlet;

a valve seat provided on an inlet side of the passage;

a valve head for opening and closing the valve seat and adapted to be acutated by said solenoid having an armature;

a stem wherein said valve head is connected to said stem, said stem being slidably supported through said valve support member of the valve housing wherein the cross sectional area of the stem is smaller than the effective area of the valve seat, and wherein a valve closing force is generated only by the inlet side fluid pressure;

a push rod having a tip portion driven by said armature driven in a valve opening direction and positioned opposite to the valve head in a valve closed position; said push rod directly engaging said valve head, wherein said armature moves the valve head via said push rod over a distance so as to move the valve head away from the valve seat when electric current is momentarily supplied to the solenoid.

2. The two-port solenoid valve as set forth in claim 1, in which the stem of the valve is passed through a through hole in the valve housing so as to project outside the valve housing.

3. The two-port solenoid valve as set forth in claim 1 further comprising a pressure chamber communicating with the outlet formed in the valve housing, the stem of the valve being passed through a through hole in the valve housing to project into said pressure chamber, and a sealed valve-reset push-button urged by a reset spring away from the valve stem is slidably projected outside the valve housing member.

4. The two-port solenoid valve as set forth in claim 1, further comprising a spring to urge the armature and a fixed iron core of the solenoid apart from each other provided therebetween, wherein a first end of a push rod to press the valve head is kept in contact with the valve head, and a second end of the push rod projects out from the fixed iron core toward the armature but without contacting with the armature.

* * * * *